United States Patent
Karns

(10) Patent No.: US 8,122,671 B2
(45) Date of Patent: Feb. 28, 2012

(54) STEEL-FRAME BUILDING AND METHOD OF MAKING

(75) Inventor: Jesse E. Karns, Long Beach, CA (US)

(73) Assignee: Mitek Holdings, Inc., Wilmington, DE (US)

( * ) Notice: Subject to any disclaimer, the term of this patent is extended or adjusted under 35 U.S.C. 154(b) by 447 days.

(21) Appl. No.: 12/229,272

(22) Filed: Aug. 21, 2008

(65) Prior Publication Data

US 2010/0043316 A1 Feb. 25, 2010

(51) Int. Cl.
*E04B 1/19* (2006.01)
*E04B 1/38* (2006.01)

(52) U.S. Cl. .............. 52/655.1; 52/653.1; 52/656.9; 52/657; 52/831

(58) Field of Classification Search .......... 52/653.1, 52/657, 656.9, 236.3, 167.3, 655.1, 831, 52/837, 848
See application file for complete search history.

(56) References Cited

U.S. PATENT DOCUMENTS

| | | | | |
|---|---|---|---|---|
| 574,434 | A * | 1/1897 | Keithley | 52/236.3 |
| 1,883,376 | A | 1/1932 | Hilpert et al. | |
| 1,899,799 | A | 2/1933 | Edwards | |
| 2,943,716 | A * | 7/1960 | Babcock | 52/653.1 |
| 3,058,553 | A * | 10/1962 | Hawes | 403/186 |
| 3,938,297 | A | 2/1976 | Sato et al. | |
| 3,952,472 | A * | 4/1976 | Boehmig | 52/655.1 |
| 4,014,089 | A * | 3/1977 | Sato et al. | 29/525.11 |
| 4,220,419 | A * | 9/1980 | Hawes | 403/189 |
| 5,174,080 | A * | 12/1992 | Yoshimura et al. | 52/252 |
| 5,497,591 | A | 3/1996 | Nelson | |
| 5,660,017 | A | 8/1997 | Houghton | |
| 5,802,169 | A * | 9/1998 | Frantz et al. | 379/398 |
| 6,009,674 | A | 1/2000 | Root | |
| 6,138,427 | A * | 10/2000 | Houghton | 52/655.1 |
| 6,219,989 | B1 | 4/2001 | Tumura | |
| 6,237,303 | B1 | 5/2001 | Allen | |
| 6,591,573 | B2 | 7/2003 | Houghton | |
| 6,634,153 | B1 * | 10/2003 | Peterson | 52/695 |
| 7,178,296 | B2 | 2/2007 | Houghton | |
| 7,637,076 | B2 * | 12/2009 | Vaughn | 52/838 |
| 2002/0124520 | A1 * | 9/2002 | Bock et al. | 52/655.1 |

(Continued)

FOREIGN PATENT DOCUMENTS

GB 2402986 A 12/2004

OTHER PUBLICATIONS

International Search Report regarding PCT/US2009/053758, mailed Mar. 30, 2010, 6 pages.

(Continued)

*Primary Examiner* — Eileen D Lillis
*Assistant Examiner* — Chi Nguyen
(74) *Attorney, Agent, or Firm* — Senniger Powers LLP

(57) ABSTRACT

An improved building structure and method for making steel frame buildings includes a beam-to-column or beams-to-column joint or connection which is most preferably shop fabricated (as opposed to on-site fabrication) and which offers a considerable savings in both steel requirements (i.e., material savings) and labor to make the joint connection. Also, because material utilization is improved in the connection, the new structure is more resistant to damage by seismic events (i.e., earthquake), by severe weather, and to damage from blast effects (i.e., terrorist attack or accident), than was the prior technology. The improved building structure also mitigates against progressive collapse of the building.

19 Claims, 6 Drawing Sheets

U.S. PATENT DOCUMENTS

Figure 1:
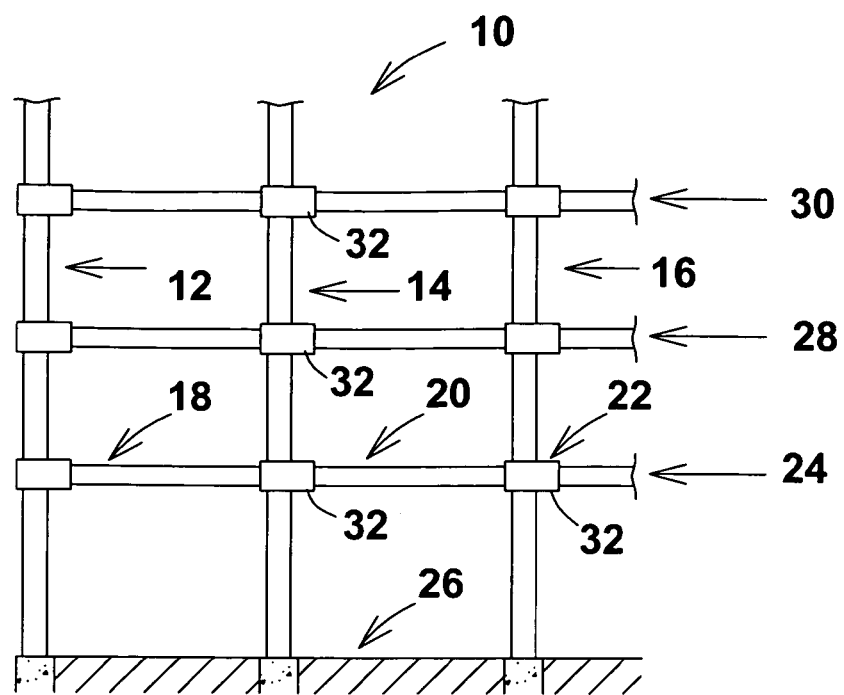

2003/0208985 A1* 11/2003 Allen et al. .................. 52/653.1

OTHER PUBLICATIONS

Office action dated Nov. 29, 2010 from U.S. Appl. No. 12/315,754, 14 pages.
Response filed Mar. 28, 2011 to Office action issued Nov. 29, 2010 in U.S. Appl. No. 12/315,754, 17 pages.
Office action dated Nov. 29, 2010 from U.S. Appl. No. 12/315,805, 14 pages.
Response filed Mar. 28, 2011 to Office action issued Nov. 29, 2010 in U.S. Appl. No. 12/315,805, 18 pages.
Office action dated Apr. 29, 2011 from U.S. Appl. No. 12/315,666, 14 pages.
Office action dated Apr. 25, 2011 from U.S. Appl. No. 12/859,437, 12 pages.

* cited by examiner

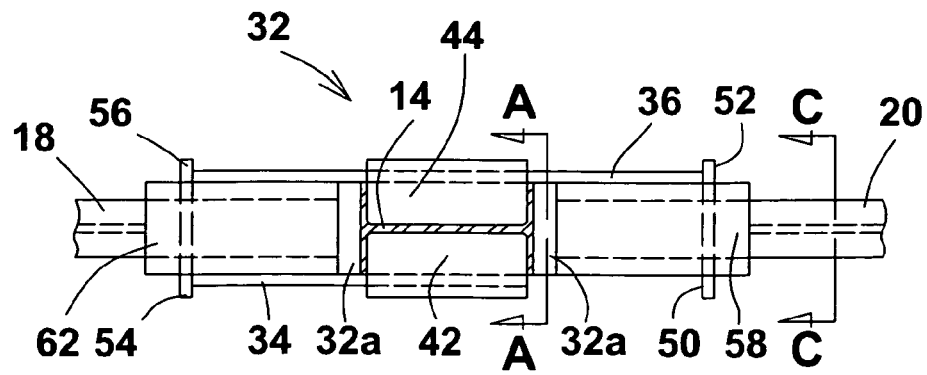
FIG. 3
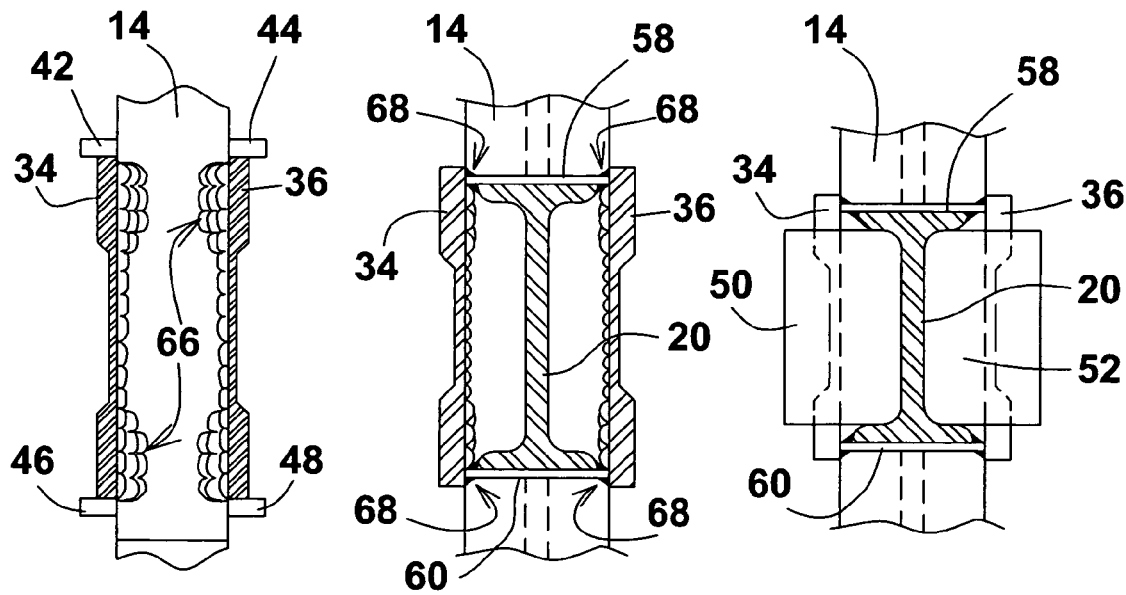
SEC. A - A
FIG. 4
SEC. B - B
FIG. 5
SEC. C - C
FIG. 6

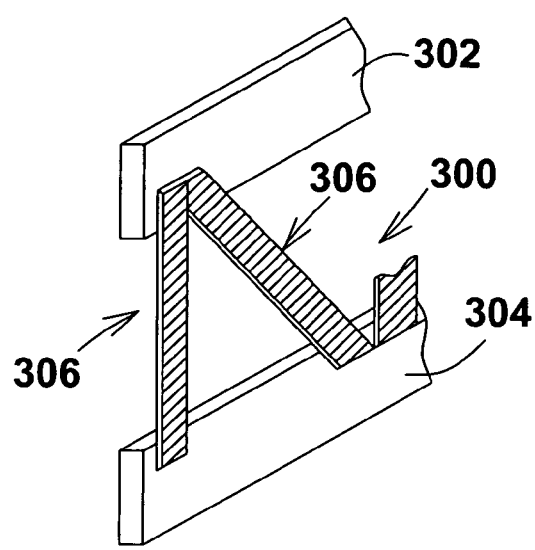
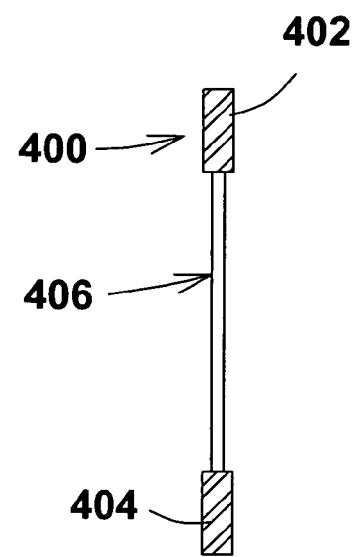
FIG. 11
FIG. 12
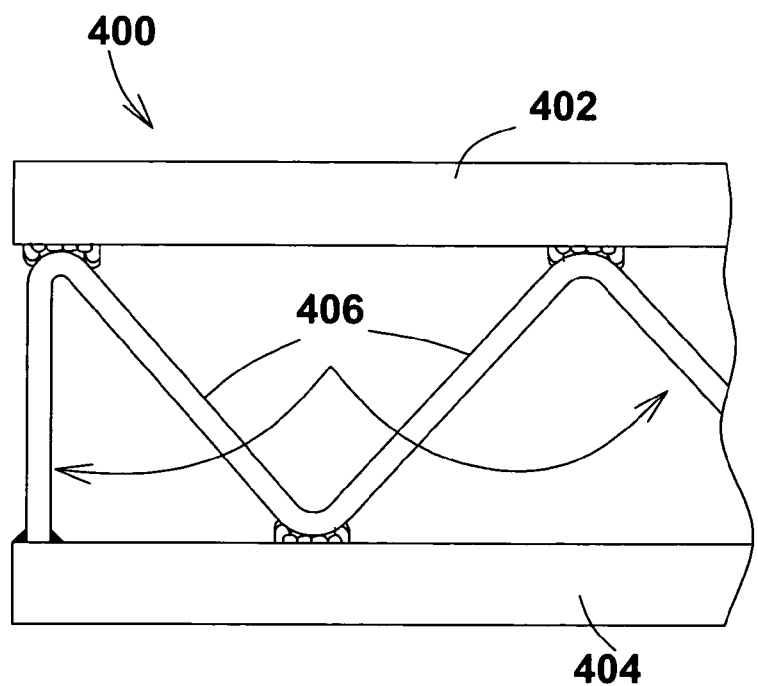
FIG. 13

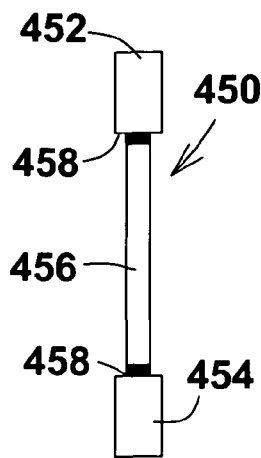
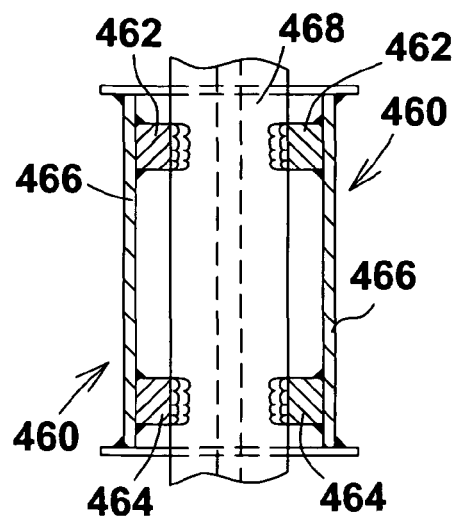
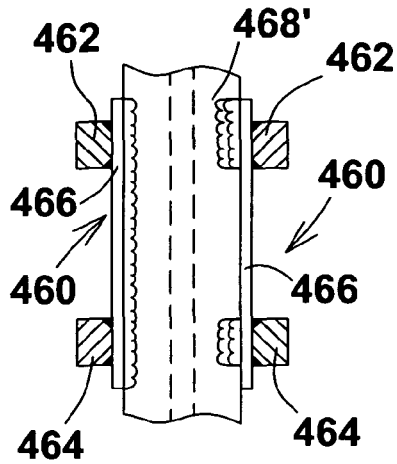
FIG. 14  FIG. 15  FIG. 16
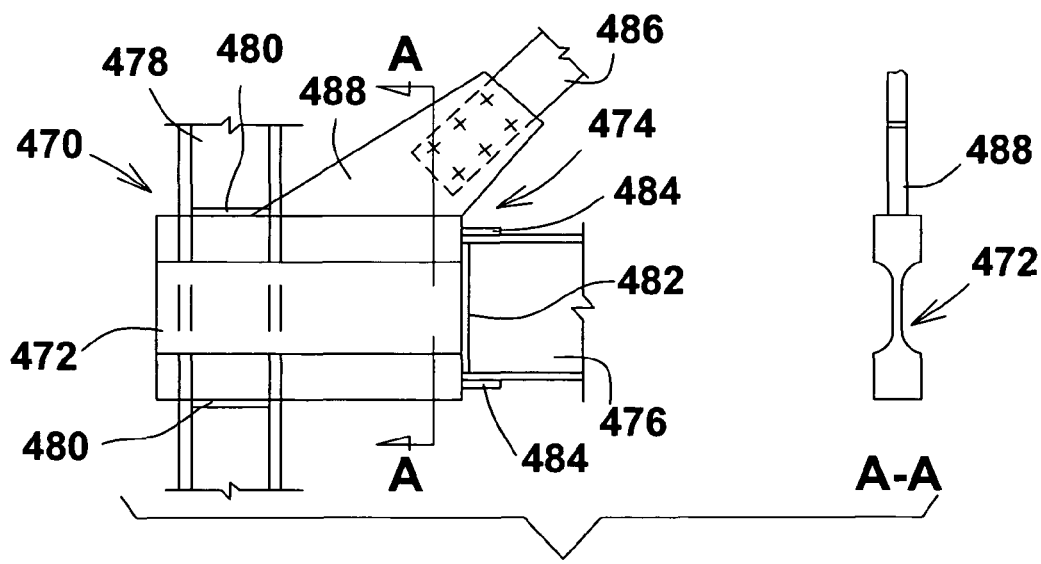
FIG. 17

STEEL-FRAME BUILDING AND METHOD OF MAKING

CROSS REFERENCE TO RELATED APPLICATION

This application is related to U.S. application Ser. No. 08/354,954, filed 13 Dec. 1994, now U.S. Pat. No. 5,660,017, granted 26 Aug. 1997.

BACKGROUND OF THE INVENTION

Buildings, towers and similarly heavy structures commonly are built on and around a steel framework. A primary element of the steel framework is the joint connection of the beams to the column. An improved structural joint connection is disclosed in U.S. Pat. No. 5,660,017. However, advanced stress analysis techniques and study of building collapse mechanisms following seismic and blast events (i.e., terrorist bombings) has resulted in the present improvement invention.

Briefly, the current technology teaches a joint structure for joining one or more beams in a supporting relationship to a column, including a pair of gusset plates spaced apart and sandwiching between them a column and a connecting beam or beams, with the gusset plates extending outwardly from the column along the sides of the beam(s). Of course, as taught in U.S. Pat. No. 5,660,017, the gusset plates may extend in both directions from a column so that they extend across the column, and connect two beams together, in a supporting relationship to the interposed column.

Fillet welds, possibly of multiple passes, are preferably used both in attaching the gusset plates to the vertical flange edges of the column and in the longitudinal welds attaching the gusset plates to the beam(s) or, alternatively, to cover plates attached to the beam.

Some of the "conventional" joint connection inventions in the prior technologies were characterized by unreliable performance of the joint connections. When such prior connections were loaded by severe moments and loads such as those caused by earthquakes, they failed. The Northridge earthquake in California in 1994 demonstrated that such prior joint connections were inadequate for resisting or carrying, (transferring), moments and loads caused by strong earthquake. Therefore, such conventional joint connections were also potentially unsuitable in the event of explosion and subsequent progressive collapse load conditions, severe weather and other potentially disastrous events. Under severe load and moment conditions, occasioned by such a potentially disastrous event, the forces and loads of the event would possibly cause the conventional joint connection to fail or perform poorly and unpredictably. The failure mode generally included one or more of: fracture of the welds, fracture of the metal of the beam or of the column, or the beam pulled divots out of the flange, (i.e., face), of the column.

In prior joint technology structures, the beam-to-to column joint connections exhibit insufficient strength and robustness, insufficient resistance to moments, insufficient resistance to inelastic strain levels of moment and axial tension, and insufficient ductility; demonstrating little or no continued strength beyond the yield point of the joint connections. Further, prior joint connection structures used more material (i.e., typically steel and weld metal) than was desired or needed, and required more labor than the current inventive joint connection for fabrication.

Over the last several years, there has been considerable additional concern as to how to improve the beam-to-column, and beam-to-beam joint connections so they will withstand explosions, blasts and the like as well as other related extraordinary load phenomena. Of particular concern is the prevention of progressive collapse of a building if there are one or more column failures due to terrorist bomb blast, vehicular and/or debris impact, structural fire, or any other impact and/or heat-induced damaging condition.

Column failures due to explosions, severe impact and/or sustained fire, have led to progressive collapse of entire buildings. An example of such progressive collapse occurred in the bombing of the A. P. Murrah Federal Building in Oklahoma City in 1995 and in the aerial attack on the World Trade Center towers in 2001.

Following the 1994, Northridge, Calif. earthquake, in addition to the invention set forth in U.S. Pat. No. 5,660,017, a number of other alternatives to resist joint connection failure, were suggested or adopted for use in steel construction design for improved seismic performance. For example, the reduced beam section (RBS), or "dog bone" joint connection, in which the beam flanges are narrowed near the joint connection has been considered. This alternative design reduces the plastic moment capacity of the beam allowing inelastic hinge formation in the beam to occur at the reduced section of the beam. This inelastic hinge connection is thought to relieve some of the stress in the joint connection between the beam and the column. An example is seen in U.S. Pat. No. 5,595,040, for Beam-to-Column Connection, which illustrates such "dog bone" connections. But, because the plastic moment capacity of the beam is reduced due to the narrowing of the beam flanges the moment load which can be sustained by the beam is substantially reduced.

Another alternative is illustrated by U.S. Pat. No. 6,237,303, in which slots and holes are provided in the web of one or both of the column and the beam, in the vicinity of the joint connection, in order to provide improved stress and strain distribution in the vicinity of the joint connection. Other post-Northridge joint connections are also identified in FEMA 350-Recommended Seismic Design Criteria for New Steel Moment Frame Building, published by the Federal Emergency Management Agency in 2000. All such post-Northridge joint connections have reportedly demonstrated their ability to achieve the required inelastic rotational capacity to survive a severe earthquake.

None of these alternative joint connections, however, provide independent beam-to-beam structural continuity across a column; such continuity being capable of independently carrying gravity loads under a "double-span" condition resulting from a column being suddenly or violently removed by, for example, explosion, blast, impact or other means, regardless of the damaged condition of the column; while also providing advantages in material, weight, and labor savings. Indeed, there are no additional and discrete load paths across the column in the event of column failure or joint connection failure or both. Additionally none of these alternatives, except the gusset plates used as taught in U.S. Pat. No. 5,660,017, provide any significant torsion capacity or significant resistance to lateral bending to resist direct explosive air blast impingement and severe impact loads. Torsion demands for the joint are created because the top flange of the beams is typically rigidly attached to the floor system of a building laterally, thereby leaving the bottom flange of the beam free to twist when subjected to, for example, direct lateral blast impingement loads caused by a terrorist attack.

SUMMARY OF INVENTION

In view of the deficiencies of the prior joint connection technologies, and the elimination of these deficiencies in the improved current joint connection technology taught in U.S. Pat. No. 5,660,017, an object for this invention is to provide further improvement to the current joint connection technology, both economically and behaviorally, including the means of making the gusset plates that are used in the current joint connection technology.

The present invention has benefited from newly-available non-linear analysis techniques, which have indicated that steel frame structures constructed with the current beam-to-column joint connection technology taught in U.S. Pat. No. 5,660,017 do not make best use of the material in gusset plates and welds used in constructing the beam-to-column joint. Further, because steel frame structures constructed with current joint connection technology utilizes too much steel, they are stiffer than needed by design. As a result, both steel quantities and fabrication costs are higher than need be for buildings constructed with the current joint connection technology, while not optimizing the behavior characteristics of the gusset plates.

In view of the above, the present invention provides an improved beam-to-column joint structure including joint connection structure comprising: a column for providing columnar support to a building; a beam intersecting with the column to carry load so that the column provides support for the beam; wherein the beam is connected to the column in a moment-resisting connection including a pair of spaced apart gusset plates horizontally sandwiching the column so that the gusset plates extend along opposite sides of and are joined to both the column and the beam. Further, the pair of gusset plates have a configured shape in vertical cross section providing a cross sectional area which is non-uniform in the vertical direction and approximates a typical strain profile through the height of each gusset plate when acting as one of a pair of parallel gusset plates subjected to inelastic levels of moment under severe load conditions.

Further, the present invention provides a steel frame building structure utilizing a plurality of such beam-to-column joint structures in a unified or holistic structure mutually supporting one another in the event of structural damage or obliteration of a part of the building structure, so that progressive building collapse is mitigated.

This invention provides a building structure including a beam-to-column, and beam-to-beam structural joint connection, the joint connection comprising: a column to provide support for the building structure; a pair of beams disposed on opposite sides of the column; wherein each of the beams has a respective one end thereof attached to the column in a beam-to-column joint connection transferring gravity load from the beam to the column and having sufficient strength to sustain axial tension substantially equal to the ultimate tensile capacity of the beam; wherein each the beam-to-column joint connection also provides a moment-resisting connection between the beam and the column capable of sustaining vertical moment on the beam substantially equal to the ultimate vertical moment capacity of the beam; wherein each the beam-to-beam joint connection also provides a connection between the pair of beams capable of sustaining the interaction of inelastic levels of vertical bending moment and axial tension; wherein the joint connection includes: a pair of spaced apart gusset plates horizontally sandwiching the column so that the gusset plates extend along opposite sides of and are joined to both the column and the pair of beams; wherein the pair of gusset plates have a configured shape in vertical cross section providing a cross sectional area which is non-uniform in the vertical direction and approximates a strain distribution in the pair of gusset plates; whereby, axial tension and moment loads caused by earthquake, severe weather, or another stressing event is sustained by the building, and whereby an extraordinary "double-span" condition for the pair of beams resulting from the loss of support by the column caused by explosive blast is also sustained by the building structure without progressive collapse.

Among the advantages of this present invention are a recognition that when a seismic catastrophe occurs, or upon blast or explosion or other disastrous events, support from one or more of the columns of a building steel frame structure may be partially or totally lost. This may be due to loss of the column and/or partial or total failure of the beams-to-column joint connections. In either event, the prior conventional beam-to-column joint connections are then insufficient and unreliable. This is because extreme axial tension and moment demands result from the creation of, and gravity loading of, a "double-span" condition of the two joined beams located on either side of a failed or explosively removed or damaged column, which exerts tremendous tensile pull and vertical moment demand on the beam-to-beam joint connection across the failed or removed column, and adjacent beams-to-column joint connections located a beam span distance away. The joint connection of the present invention is best able to resist this condition.

Further, in the present invention the beam-to-column joint connections advantageously includes two improved or optimized gusset plates disposed on opposite sides of the beam and column and providing major elements of the improved joint connection, and connected to both of the beams and thus connect them together. The beam-to-beam connection provided by the improved or optimized gusset plates is sufficiently strong to greatly mitigate the damage from blasts, explosions, earthquakes, tornadoes and other violent disasters. The beams may be co-linear, somewhat angled with respect to each other, or even curved, as in the practice in constructing a curved facade for buildings.

In the present invention, as stated above, the gusset plates cover and protect the beam-to-column joint connections which attach one or two or more beams to a column. The columns typically utilize the gusset plates connection taught in U.S. Pat. No. 5,660,017, in which the gusset plates are not only welded to the beams (or cover plates on the beams, as the case may be), but, the gusset plates are also, welded directly, in a vertical direction, to the flange tips of the column by fillet welds, thus, creating through the gusset plates substantial moment-resisting connections. In other cases, where the retrofit of existing prior conventional joint connections is desired, as taught in U.S. Pat. No. 7,178,296, the continuous gusset plates may not be welded at all to the column that they sandwich, preferring instead to provide a beam-to-beam connection that is structurally independent of the column and which connection can mitigate the damage caused by the sudden, violent loss of support from that column or violent loss of joint connections of the beams to the column.

It is therefore an object of this invention to provide an improved, continuous, beam-to-beam connection across a column, which connection can mitigate the damage caused by the sudden, violent loss of support from that column; or can mitigate the damage caused by the sudden, violent loss of joint connections of the beams to the column, which connection is structurally independent of the column.

It is another object of this invention to provide an improved beam-to-beam connection across a column, which connection is not dependent on the continued effectiveness of the column; nor the effectiveness of beams-to-column joint connections constructed using conventional prior joint connection technology.

Still another object of this invention is to provide a beam-to-beam connection across a column which mitigates the likelihood of progressive collapse of the entire building or similarly heavy structure, upon loss of support from the column; or loss of effective beams-to-column joint connections constructed using conventional prior joint connection technology.

It is another object of this invention to provide a beam-to-beam connection at a joint connection of beams to a column, which beam-to-beam connection and the beams can carry the gravity and other loads on the beams upon the loss of column support; or loss of beam-to-columns joint connection constructed using conventional prior joint connection technology.

It is another object of this invention to provide a structural beam-to-beam connection which remains effective after violent loss of column support; or violent loss of beam-to column joint connection constructed using conventional prior joint connection technology.

Further objects, features, capabilities and applications of the inventions herein will be apparent to those skilled in the art, from the following drawings and description.

BRIEF DESCRIPTION OF THE DRAWING FIGURES

Figure 2:
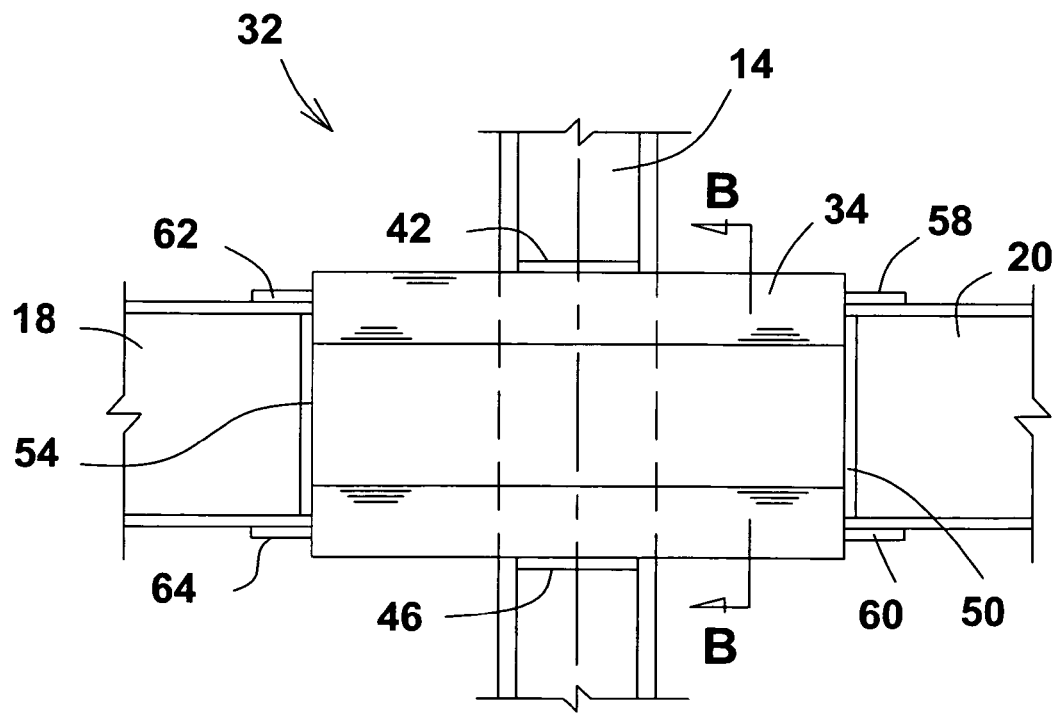
Figure 8:
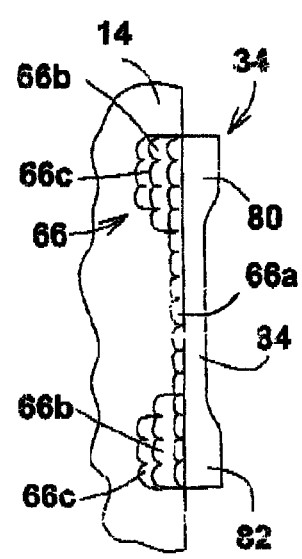
Figures 9, 10:
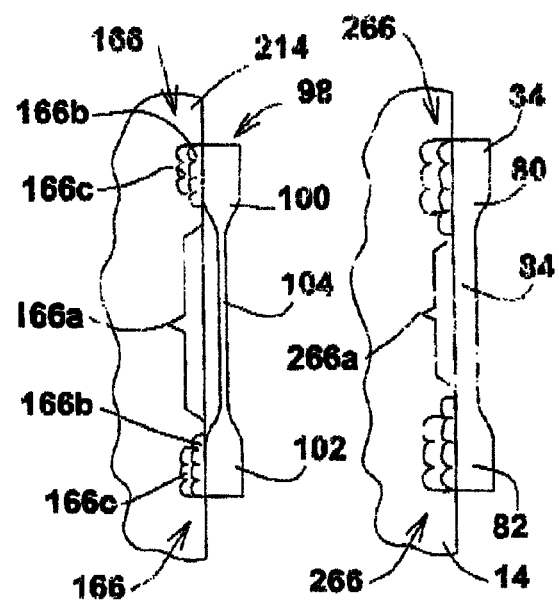

FIG. 1 is a fragmentary front elevation view of a framework for a building or similar heavy structure, and illustrates plural columns supporting several levels or floors of the building defined by horizontal beams, and also illustrating gusset plates of the beams-to-column joint connections according to this invention;

FIG. 2 provides a fragmentary elevation view at considerably enlarged size of a single beams-to-column joint connection as seen in FIG. 1;

FIG. 3 is a fragmentary plan view of the joint connection seen in FIG. 2;

FIGS. 4, 5, and 6, respectively provide cross sectional views taken at the indicated section lines of FIGS. 2 and 3;

FIGS. 7*a* through 7*g* illustrate alternative cross sectional shapes for gusset plates to be used in a joint connection according to this invention;

FIGS. 8, 9, and 10, respectively provide illustrations of alternative fillet weld techniques and weld pass configurations which may be utilized to attach a gusset plate disposed in orientations and cross section according to this invention to the flange tip of a column as part of a joint connection embodying this invention;

FIG. 11 provides a fragmentary perspective view of yet another alternative gusset plate construction, which is a weldment composed of two horizontal strap members trussed by interconnecting diagonal and vertical strap members consisting of flat bar, angles, or plates;

FIGS. 12 and 13 respectively provide an end elevation view and a side elevation view of still another alternative gusset plate construction, which is a weldment composed of two horizontal strap members trussed by formed bar, rod or other suitable continuous member.

Figure 18:
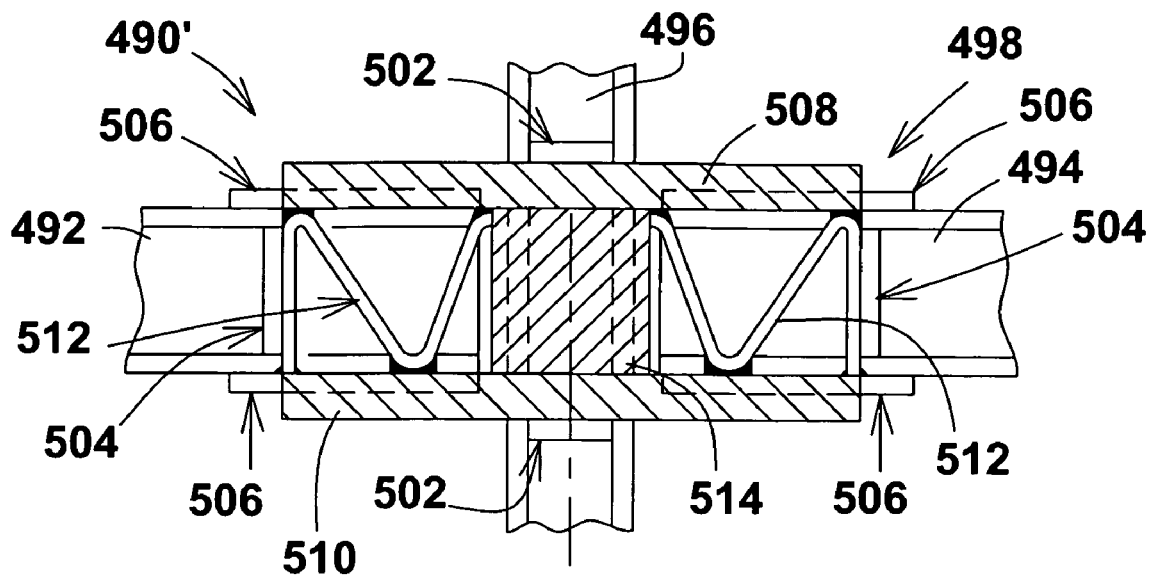
Figure 19:
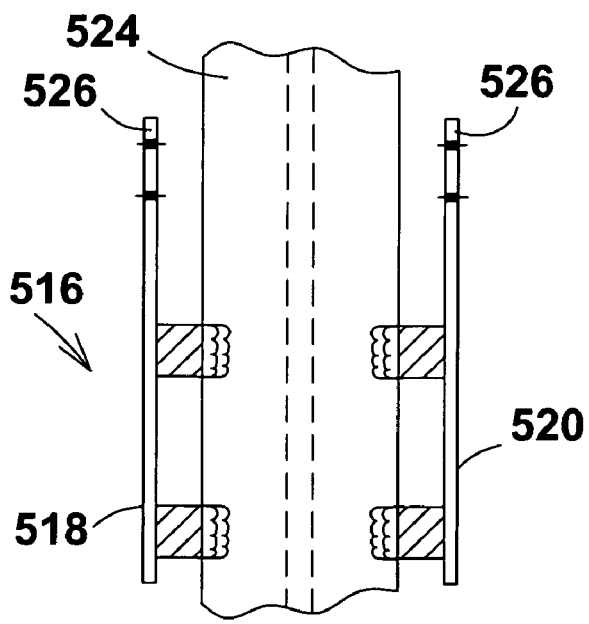

FIG. 14 provides an illustration of still another alternative cross sectional shape which is a plate weldment construction composed of an upper and lower thicker plate or bar which are welded to a central thinner plate with alternative weld joint configurations to configure a gusset plate to be used in a joint connection according to this invention;

FIGS. 15, and 16, respectively provide illustrations of alternative gusset plate constructions, and of alternative weld techniques and weld bead structures which may be utilized to attach a gusset plate according to this invention to the tip of a column flange as part of a joint connection embodying this invention;

FIG. 17 is a fragmentary elevation view and an associated fragmentary cross sectional view of a single beams-to-column joint connection including an alternative welded provision for a structural braced frame construction;

FIG. 18 is a fragmentary plan view of the joint connection according to this invention, and utilizing a gusset plate structure of strap, truss, and plate weldment construction; and FIG. 19 is a fragmentary elevation view similar to FIG. 15, but showing an embodiment of a beams-to-column joint connection including provision for a structural braced frame construction similar to that shown in FIG. 17.

DETAILED DESCRIPTION OF EXEMPLARY PREFERRED EMBODIMENTS OF THE INVENTION

The structural steel commonly used in the steel frameworks of buildings is generally produced in conformance with standards A-36, A-572 and A-992 specifications. High strength aluminum and other high-strength metals might be found suitable for use in this invention under some circumstances. It is recognized that other materials, particularly in the gusset plates and, possibly in other elements of the joint connections, might be used. For example, in the gusset plates, other shapes might be used in addition to those illustrated herein. So, the invention is not limited to the precise details of the embodiments shown and described herein.

Commonly shown in the drawings herein are fillet welds, and full-penetration, single bevel groove welds. The mention or illustration of a particular kind of weld herein, does not preclude the possibility of other kinds of welds being found suitable by a person skilled in the art. In a particular application, it might well be found suitable to use partial-penetration groove welds, flare-bevel groove welds and even other welds and forms of welding, which will be familiar to those ordinarily skilled in the pertinent arts.

Also, this invention is not limited to a particular configuration of or shape of beams and columns. Other shapes of columns or beams may be found suitable and capable of applying the inventions herein described, such as square or rectangular structural tube and box built-up shapes.

FIG. 1 provides a fragmentary front view (i.e., a portion of) the framework of a building 10, tower, or similarly heavy structure. This structure includes columns 12, 14, and 16 supporting beams 18, 20, and 22 comprising the first floor 24 of the building 10. The building 10 stands upon ground support 26. Although shown only in front view, it is to be understood that the structure is three-dimensional and the remainder of the structure is similarly constructed.

A second floor 28 and third floor 30 are shown above the first floor 24. These second and third floors, and possibly additional higher floors are constructed as shown and described for the first floor 24. That is, the columns of the successive floors are generally aligned with and bear the weight of their own floor and of floors above. Beams 18 and 20 are connected by an exemplary joint connection 32, as is best seen in FIGS. 2 and 3. The other joint connections seen in FIG. 1 for the first through third floors (and for higher floors as well) are similar. It will be noted that joint connection 32 provides for load transfer and connection among at least two beams and a column 14. Joint connections at a building corner or at an outside face of the building 10, or at an interior location of building 10, may also be similar although they may connect together a differing disposition and number of beams and a column.

Turning now to FIGS. 2 and 3 considered together, and also in conjunction with sectional views 4-6, it is seen that the joint connection 32 joins beams 18 and 20 together, and to column 14. Although the invention is not so limited, the beams 18 and 20 are of I-beam or H-beam configuration, as is the column 14. In other words, any of the beams 18 or 20, or column 14 (or other beams or columns of the building 10) could be of a different configuration. For example, any of the elements 14. 18 or 20, (or other elements) may be made of structural square or rectangular tubing, box built-up shapes, or of another type or configuration of structural shape.

As is seen in FIGS. 2-6, the joint connection 32 includes (in summary): a spaced apart parallel pair of vertical gusset plates 34, and 36 sandwiching the beams 18 and 20 and column 14 therebetween; four continuity plates 42-48 arranged in vertically (and horizontally) spaced pairs generally aligned at the top and bottom edges of the gusset plates (only the upper and lower ones of these plates are seen in FIG. 2, while the two upper continuity plates 42 and 44 are seen in FIG. 3); four shear plates 50-56 arranged in aligned pairs at opposite ends of the gusset plates 34, 36 (two of which are seen in FIG. 6, and two of which are visible in FIG. 2 as well); and four cover plates 58-64 arranged in pairs sandwiching a respective one of the beams 18, 20, and connecting the gusset plates 34, 36. As is best seen in FIG. 3, the beams 18, 20, and cover plates 58-64 define a gap 32a with the column 14. The gusset plates 34, 36 span the gap 32a.

Throughout fabrication of the joint connection 32, good structural welding practices are used in assembling the components of this joint connection. For example, welding techniques including: Electroslag process, complete joint penetration (CJP) welds, either with beveled or square groove joint configuration, fillet welds, and partial CJP joint configuration. It will be understood that at the time of shop fabrication, preferably the joint connection 32 includes a comparatively short section of column 14 and comparatively short sections of beams 18 and 20. These comparatively short sections of column and beams are preferably shop-fabricated with the remainder of the components of joint connection 32 as shown and described. The shop-fabricated joint connection 32 is then supplied to a construction site where field-welds are used to assembly the remaining parts of the column 14 and beams 18, 20, into the building frame-work structure illustrated in FIG. 1.

For example, continuity plates 42 and 46 and also gusset plate 34 would be fillet welded to vertical shear plates 50 and 54. Gusset plate 36 may be similarly fillet welded to corresponding continuity plates 44 and 48 on the other side of column 14, and vertical shear plates 52 and 56 corresponding to vertical shear plates 50 and 52, on the other side of beams 18 and 20. The gusset plates 34 and 36 are fillet welded to the edges of the top and bottom flanges of the two beams 18 and 20, as is best seen in FIG. 4, and about which more is explained below.

Similarly, viewing particularly FIG. 4, it is seen that a multi-pass fillet weld 66 joins each of the gusset plates 34 and 36 to the outer edge of the flanges of column 14 at each side of this column (i.e., two such welds for each of the gusset plates 34 and 36). It will be seen that the joint connection 32 in general is welded and assembled in accord with good welding practices and the teaching of U.S. Pat. No. 7,178, 296, granted 20 Feb. 2007, and referenced above.

Particularly, it will be noted in FIG. 4 that the fillet welds 66 have a size (i.e., cross sectional area) which varies in the vertical direction along this weld. The significance of this variation in weld area for welds 66 is further explained below. Similarly, the gusset plates 34 and 36 are "configured" or contoured, so that each has a cross sectional area which also varies in the vertical direction along the depth (i.e., vertical direction) of these gusset plates. Advanced non-linear analysis of the connection joint structure 32 has revealed that contrary to traditional linear elastic stress analysis assumptions (which would assume a triangular distribution or curve of stresses in the gusset plates 34, 36 above and below the neutral axis), the actual stress and strain distribution curve in these gusset plates 34 and 36 is much higher than expected near the outer edges (i.e., top and bottom edges) and falls off rapidly to a much lower than expected stress and strain level near the neutral axis. So, in fact, the stress and strain distribution in gusset plates 34 and 36 is not triangular in shape when graphed, and is not linear, but is a high value near the top and bottom surfaces of the gusset plates, decreasing rapidly with vertical distance toward the neutral axis, and reaching a rather low level much sooner than traditional stress and strain analysis techniques would indicate in the area approaching and around the neutral axis.

Consequently, gusset plates 34, 36 need not be (and desirably are not) of uniform cross sectional area along the vertical direction. Instead, these gusset plates are "contoured" or configured along their vertical cross section (as is best seen in FIGS. 4-6) in order to provide an approximation of the actual stress and strain distribution in these gusset plates from the top edge of the gusset plate to the bottom edge. Particularly, the cross sectional area of the gusset plates 34, 36 when considered in vertical section approximates the stress distribution in these plates. More particularly, when considering straining of the gusset plate material which surpasses the elastic limit for the material, the cross sectional area of the gusset plates approximates the strain distribution in these gusset plates. This contouring of the gusset plates 34, 36 in concert with the area variation of the fillet welds 66 provides both an important reduction in labor and material requirements for making the joint connection 34, and also provides an improvement in the strength and performance of the joint connection when considered in concert with the ultimate strength and likely failure mode of beams 18 and 20. That is, the joint connections illustrated and described in U.S. Pat. No. 7,178,296 are already so strong and stiff that the ultimate failure mode for the building structure when columnar support is removed at a selected location is bending and tensile separation of one of the horizontal beams at a location spaced from a joint connection structure.

By contouring the gusset plates 34, 36 as herein described, an improved distribution of stress and strain is achieved, thus making the joint connection 32 itself somewhat more flexible, and therefor likely increasing the rotational capacity of joint connection 32. This further likely enhances the rotational capacity of the global steel frame system which consists of steel frame beams and columns connected together using a multiplicity of joint connections like joint connection 32. Still further, this improvement in the joint connection 32 likely improves the primary structural resistance for stabilizing the entire building structure against collapse when it is subjected to severe load conditions. It is to be recalled that the joint connections of the building 10 (i.e., like connection 32) comprise the primary structure for prevention of structural collapse by providing a beam-to-beam connection, and beam-to-column connection, for this building, which connections are combined moment and axial tension connections that will remain effective during and after a major earthquake, or upon loss of support from a column, or loss of the beams-to-column joint connections in the event the building includes such beams-to-columns connections using prior joint connection technology, or both.

Accordingly, at the location of a hypothetically removed or damaged column, the gusset plates not only provide shielding to the beams-to-column joint connection, but also are capable of developing the ultimate axial tensile strength and vertical moment flexural strength of the beams upon the occurrence of a blast, explosion or other disastrous event. In addition, substantial "torsional" strength and "lateral moment" strength are provided by such gusset plates. Such beam-to-beam connection, using the gusset plates of the invention, is capable of resisting axial tensile forces and flexural moments to the ultimate capacity of the beams. Thus, the ultimate capacity of the beams is developed in the event of extreme loads placed on them by blast, explosions, earthquakes, tornadoes and other disastrous events. That is, the gusset plates are fixedly attached, with respect to each beam, by an axial tension and moment connection which can resist the large axial tension created by a large vertical displacement of a "double-span" beam, which acts more like a cable than a beam upon loss of support from the column, or upon the loss of integrity of a beams-to-column joint connection constructed using the prior joint connection technology, and also, can resist moments substantially equal to the flexural capacity of these beams upon loss of support from (or joint connection to) the column.

As can be seen, axial tension and moment strength is obtained from longitudinal welds 68 (best seen in FIG. 5) between the gusset plates 34, 36 and the cover plates 58-64 which are welded to the beams 18 and 20, holding the beams together (via the gusset plates 34, 36, whether or not there is any support from the column 14. Increased moment capacity and joint connection stiffness from the gusset plates are obtained about both the major axis (i.e., the stronger axis) of each of the beams and the minor axis (i.e., the weaker axis) of each of the beams (i.e., via the box section created by the gusset plates 34, 36 and the cover plates 58-64). The present invention provides tension and moment joint connections in which the gusset plates provide both significant torsional resistance, and bending resistance about the major and minor axes of each of the beams at the connection.

Figure 7:
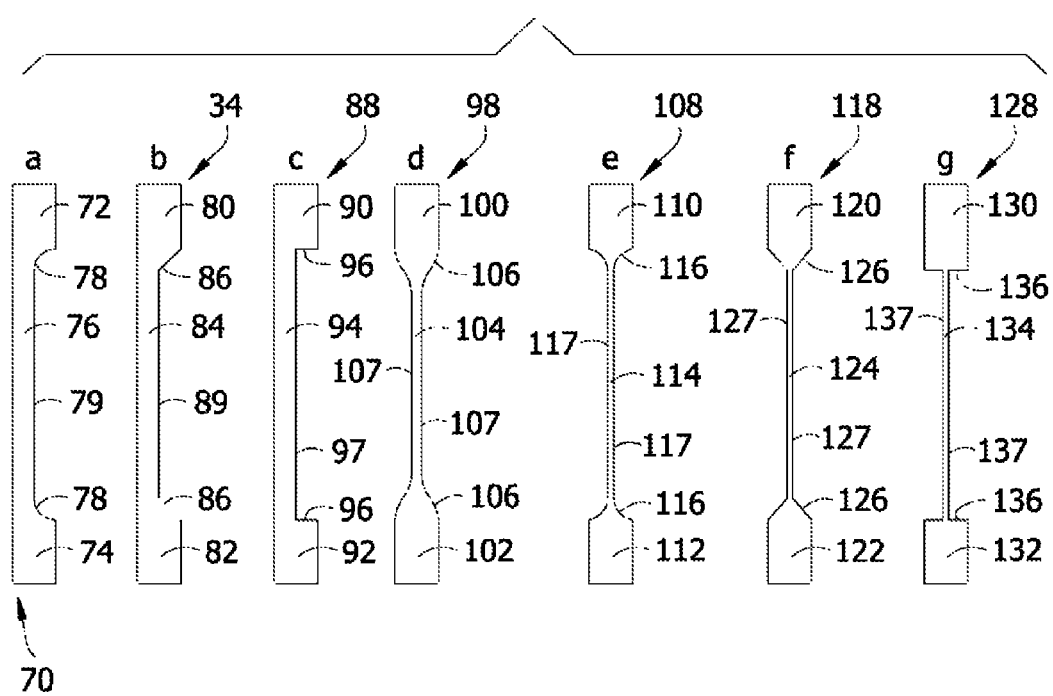

Turning now to FIG. 7, alternatives a-g illustrate possible variations for coutouring or configuring of the gusset plates 34, 36. These alternatives are not exhaustive, but are merely illustrative. Considering the alternative of FIG. 7a, it is seen that an exemplary gusset plate 70 is configured with top and bottom sections 72, 74 which are rather thick in the horizontal direction, which provides a large cross sectional area near the top and bottom margins of the gusset plate, and which blends with a central thinner section 76 via a pair of concave transition surfaces 78 forming a horizontally extending recess 79.

On the other hand, the alternative of FIG. 7b, which is the alternative seen in FIG. 2-6. is seen to provide a gusset plate 34 (i.e., the same as gusset plate 36) which is configured with top and bottom sections 80, 82 which are rather thick in the horizontal direction, and providing large cross sectional areas near the top and bottom margins of the gusset plate. This gusset plate has a central thinner section 84 of thinner cross section, blending with the sections 80, 82, via a pair of slanted transition surfaces 86 forming a horizontally extending recess 89.

Viewing the alternative gusset plate of FIG. 7c, it is seen that a gusset plate 88 may be provided with top and bottom sections 90, 92 which are thick in the horizontal direction, and join with a central thinner section 94 of thinner cross section. The top and bottom thick sections 90, 92 blend with the section 94 via a pair of step transition surfaces 96 forming a horizontally extending recess 97.

Alternative gusset plate configurations 7d through 7g illustrate that a gusset plate according to this invention need not be flat on one side and contoured only on the other side per embodiments 7a through 7c. That is, the alternative of FIG. 7d, is seen to provide a gusset plate 98 configured with top and bottom sections 100, 102 which are thick in the horizontal direction, and providing large cross sectional areas near the top and bottom margins of the gusset plate. Gusset plate 98 has a central thinner section 104 of thinner cross section, blending with the sections 100, 102, via four convex transition surfaces 106 forming a pair of opposing horizontally extending recesses 107. As is seen in FIG. 7d, the gusset plate 98 is not flat on either side, but has a "waist" when viewed in end view or in cross section.

The alternative of FIG. 7e, is like that of FIG. 7d, with the exception of utilizing transition surfaces 116 which are concave. This gusset plate 108 has thicker top and bottom sections 110, 112, and a thinner central section 114. The sections 110 and 112 blend with section 114 via four concave transition surfaces 116 forming a pair of opposing horizontally extending recesses 117. Again, the gusset plate 108 is not flat on either side, but has a "waist" when viewed in end view of in cross section.

An alternative gusset 118 plate seen in FIG. 7f utilizes transition surfaces 126 which are angulated. This gusset plate has thicker top and bottom sections 120, 122, and a thinner central section 124. The sections 120 and 122 blend with section 124 via four angled transition surfaces 126 forming a pair of opposing horizontally extending recesses 127.

Finally, another alternative gusset 128 plate seen in FIG. 7g includes transition surfaces 136 which are stepped. This gusset plate 128 has thicker top and bottom sections 130, 132, and a thinner central section 134. The sections 130 and 132 blend with section 134 via four stepped transition surfaces 136, which extend substantially parallel to the thickness of this gusset plate and form a pair of opposing horizontally extending recesses 137.

Turning to FIG. 8, an example is presented of how the vertical weld 66 may be varied in cross sectional area vertically along the gusset plate 34 in order to secure this gusset plate to the flange tip of the column 14. Viewing FIG. 8, it is seen that the weld 66 includes a first vertical section of weld pass (i.e., weld bead) 66a which is continuous from top to bottom of the gusset plate 34. Generally in alignment with the thicker sections 80 and 82, the weld 66 includes two additional sections of weld pass (i.e., weld bead) 66b, which assist in strengthening the weld 66. Finally, weld 66 includes a pair of vertical sections 66c of weld pass (i.e., weld bead) placed in general alignment to the upper most and lower most portions 80 and 82 of the gusset plate 34. In view of the above, it is seen that the gusset plate 34 is of non-uniform cross section vertically along its depth, and is secured to the flange of a column 14 by a weld 66 which is also non-uniform in cross section along its vertical direction. Both the gusset plate 34 and the weld 66 in their area approximate the stress and strain distribution in the gusset plate 34.

FIG. 9, provides an example of how a gusset plate (such as the plate 98 seen in FIG. 7d) can be welded to the flange tip of a column 214. Viewing FIG. 9, it is seen that a vertically extending weld 166 varies in cross sectional area vertically along the gusset plate 98 in order to secure this gusset plate to the flange tip of the column 214. In fact, the weld 166 defines a gap 166a spanning the thinner section 104 of the gusset plate 98, so that the plate is not welded to the flange tip of the column within this gap 166a. The gap 166a causes the weld 166 to better match the stress and strain distribution within the gusset plate 98. Viewing FIG. 9, it is seen that the weld 166 includes a two vertical sections of weld pass (i.e., weld bead) 166b generally aligned with the thicker sections 100 and 102 of the gusset plate 98. Additionally, weld 166 includes a pair of vertical sections of weld pass (i.e., weld bead) 166c placed in general alignment to the upper most and lower most portions 100 and 102 of the gusset plate 98. Again, the gusset plate 98 is of non-uniform cross section vertically along its depth, and is secured to the flange tip of a column 214 by a weld 166 which is also non-uniform along its vertical direction. And again, both the gusset plate 98 and the weld 166 approximate by their cross sectional areas the stress and strain distribution in the gusset plate 98.

FIG. 10, illustrates that a gusset plate 34, which has a flat side, and which could be welded continuously along this flat side to the flange of a column 14, does not necessarily have to be so welded continuously along the full height of the gusset plate 34. That is, the weld 266 may define a gap 266b as was described by reference to FIG. 9 (i.e., gap 166a). This configuration of weld may be utilized in order to best match the gusset plate (and its attachment to a column) to the stress and strain distribution within the gusset plate.

Turning now to FIGS. 11-13, two alternative embodiments are presented of gusset plates which are of a "truss" configuration. That is, while the gusset plates illustrated and described earlier herein had a continuous comparatively thin central section which in cross section was considerably less thick than the top and bottom sections of the gusset plate, the embodiments of FIGS. 11-13 are of truss construction, and do not include a continuous central section. Considering FIG. 11, a gusset plate 300 is presented, which includes an upper portion 302 and a parallel lower portion 304, both of strap configuration. That is, the portions 302, 304 may be fabricated of steel strip or strap stock. Extending between the upper and lower portions 302, 304 generally in a zigzag or truss configuration, is a plurality of connecting members, generally indicated with the numeral 306. The members 306 may also be formed of steel strap stock, and are welded to the upper and lower members 302, 304.

FIGS. 12 and 13 provide end and side elevation views, respectively, of another gusset plate 400, including a horizontal upper portion 402, and a parallel lower portion 404, both also of strap construction. That is, the portions 402, 404 may be fabricated of steel strip or strap stock. Extending between the upper and lower portions 402, 404 generally in a zigzag or truss configuration, is a continuous connecting member, generally indicated with the numeral 406. The continuous member 406 may be formed of steel bar stock bent into the required shape, and welded to the upper and lower members 402, 404. It will be understood in view of the above, that the gusset plates of FIGS. 11-13 probably represent the greatest weight reduction which may be achieved in a joint connection according to this invention. On the other hand, the gusset plate alternative configurations of FIG. 7 provide a considerable weight reduction over the conventional technology, a savings in fabrication costs and time requirements (in part because of the decease in welding necessary for the construction of the joint connection), and a likely improvement in joint performance over the conventional technology.

Turning now to FIG. 14, another alternative structure for a gusset plate according to this invention is seen. FIG. 14 illustrates that a gusset plate according to this invention need not be made of a single piece of metal, but can be made as a weldment. Viewing FIG. 7, a gusset plate 450 is configured with a top and bottom sections 452, 454 which are rather thick in the horizontal direction, which provide a large cross sectional areas near the top and bottom margins of the gusset plate, and which joins with a central thinner section 456 via a pair of transition surfaces 458. In fact, at the transition surfaces 458, the top and bottom sections 452, and 454 are welded to the central section 456 using alternative weld configurations including a square groove weld butt joint (as shown in FIG. 14), a double bevel or single bevel joint complete-penetration weld configuration, or a partial joint penetration weld.

FIGS. 15 and 16, provide illustrations of similar weldment gusset plate structures joining with a vertical column, as will be further explained. Considering FIG. 15, another alternative structure for a gusset plate according to this invention is seen. FIG. 15 illustrates that a gusset plate according to this invention need not be made of a single piece of metal, but can be made as a weldment. Viewing FIG. 15, a gusset plate 460 is configured with parallel spaced apart top and bottom sections 462, 464 which are joined to and are overlapped with a plate member 466. In combination, the welded built-up top and bottom sections and plate member are rather thick in the horizontal direction, and together provide large cross sectional areas near the top and bottom margins of the gusset plate 460. Intermediate of the top and bottom sections, the plate 466 alone forms the central section of this gusset plate structure 460, and is thinner and has a smaller cross section than does the combined top and bottom sections and plate together. The top and bottom sections are welded to the central section of this gusset plate structure. As is seen in FIG. 15, the gusset plate 460 is preferably welded to the flange tips of a column 468 via the top and bottom sections 462 and 464.

FIG. 16 illustrates alternative ways of joining a gusset plate as described by reference to FIG. 15 to a column 468'. On the left-hand side of the column 468', it is seen that the gusset plate is joined by welding to the column along the full height of plate portion 466. In this case also, as was explained earlier, the vertical weld joining the gusset plate to the flange tip of the column may include additional full or partial weld passes (i.e., forming corresponding weld beads) so that the weld pass structure (i.e., weld bead structure) also varies in area (as does the gusset plate) as an approximation of the stress distribution on the gusset plate. On the right-hand side of the column 468', it is seen that a gusset plate is joined by welding to the flange tip of the column along the plate portion 466, but in this case, the weld passes (i.e., weld beads) are aligned only with the top and bottom sections 460 and 462. This arrangement of the weld bead joining the gusset plate to the flange tip of the column well approximates the stress and strain distribution actually experienced in the gusset plate.

FIG. 17 provides a fragmentary view of still another alternative embodiment of joint connection utilizing gusset plates according to this invention. In the embodiment of FIG. 17, a joint connection 470 includes a parallel spaced apart pair of gusset plates 472, 474 (only one of which is seen in FIG. 17) sandwiching a beam 476 and a column 478 therebetween. The joint connection includes the by now familiar continuity plates (generally indicated with arrowed numerals 480) and shear plates (generally indicated with arrowed numerals 482) and cover plates (generally indicated with arrowed numerals 484). In this case, the joint connection 470 also provides for a structural connection of a diagonal structural bracing member 486 (only a part of which is seen in FIG. 17) to the beam 476 and column 478. In order to accomplish this connection with the bracing member 486, the gusset plates 472, 474 have joined to them (as by welding—although the invention is not so limited) a parallel spaced apart pair of joining plates 488, 490 (only one of which is seen in FIG. 17) which are generally of trapezoidal shape. Joining plate 488 is seen in side elevation view in FIG. 17, and is presented in sectional elevation view in Section A-A of this Figure. The preferred embodiment is to use a pair of such joining plates, which join directly one to each of the pair of gusset plates 472, 474 in order to sandwich and allow the bracing member 486 to be connected into the joint connection 470 via both of the gusset plates. A single joining plate may be employed, if desired.

Considering now FIG. 18, another alternative embodiment of joint connection is presented in which the gusset plates are of a hybrid "truss and plate" configuration. That is, while the truss configuration of gusset plates illustrated and described earlier herein had top and bottom members of strap or bar configuration which were spaced apart and connected by truss elements (or by a single folded or bent truss element), the embodiment seen in FIG. 18 adds an additional centrally located (i.e., generally at the connecting column) load transfer plate portion. Considering FIG. 18, it is seen that a joint connection 490 joins beams 492 and 494 together, and to column 496. Again, the joint connection 490 includes a parallel spaced apart pair of gusset plates 498, 500 (only one of which is seen in FIG. 18), sandwiching the beams 492 and 494 and column 496 therebetween. The joint connection also includes four continuity plates, generally indicated with arrowed numerals 502, four shear plates, generally indicated with arrowed numeral 504, and four cover plates, generally indicated with arrowed numeral 506 (not all of the plates 502, or 504 being seen in FIG. 18). However, as is clearly seen in FIG. 18, the gusset plates 498, 500 are constructed as hybrid "truss and plate" elements, including an elongate upper and lower element 508, 510 which may be made of steel strap or bar stock. Spacing the upper and lower elements 508, 510 apart, and connecting these elements, is a pair of spaced apart truss elements, generally indicated with the numeral 512. As was the case with the truss elements introduced earlier, the elements 512 may be made of several strap members welded between the upper and lower elements 508, 510, or each may be made, for example, of a single piece of bar stock bent to zigzag back and forth between the upper and lower elements. Intermediate of the truss elements 512, and in alignment with the column 496, the joint connection 490 includes a centrally located load transfer plate portion 514. This load transfer plate portion extends between and connects (i.e., is welded between) the upper and lower elements 508, 510, and also may be welded to the flange tips of the column 496.

Finally, FIG. 19 provides a fragmentary view of still another alternative embodiment of joint connection utilizing gusset plates according to this invention. In the embodiment of FIG. 19, a joint connection 516 includes a spaced apart parallel pair of gusset plates 518, 520 sandwiching a beam (not seen in this drawing Figure) and a column 524 therebetween. Again, in this case the joint connection 516 provides for structural connection of a diagonal structural bracing member (not seen in FIG. 19) to the beam and column 524. The connection of such a diagonal or angulated structural bracing member will be familiar from the disclosure and description concerning FIG. 17. In this embodiment, the gusset plates 518, 520 are constructed similarly to the plates described by reference to FIGS. 15 and 16. However, these gusset plates 518, 520 each include an integral extended plate portion or ear 526, providing for connection with the diagonal or angulated structural bracing member therebetween. That is, the portions 526 of the gusset plates 518, 520 are generally parallel and spaced apart to receive therebetween and to sandwich an end portion of the structural bracing member. Again, it is to be understood that this embodiment employs gusset plates 518, 520 which are preferably made as weldments.

While the present invention has been illustrated and described by reference to preferred exemplary embodiments of the invention, such reference does not imply a limitation on the invention, and no such limitation is to be inferred. Rather, the invention is limited only by the spirit and scope of the appended claims giving full cognizance to equivalents in all respects.

I claim:

1. A joint connection structure comprising:
a column having a longest dimension and providing columnar support to a building;
a beam having a longest dimension and intersecting with said column to carry load so that said column provides support for said beam;
wherein said beam is connected to said column in a moment-resisting connection including a pair of spaced apart gusset plates horizontally sandwiching said column so that said gusset plates extend along opposite sides of and are joined to both said column and said beam;
wherein each gusset plate has a length extending generally parallel to the longest dimension of the beam and orthogonal to the longest dimension of the column when the gusset plates are joined to the column and beam, a height extending generally parallel to the longest dimension of the column and orthogonal to the longest dimension of the beam, and a thickness extending generally orthogonal to the length and height of the gusset plate, the thickness having a configured shape in vertical cross section which is non-uniform in the vertical direction such that a thickness of the vertical cross section of the gusset plate varies in the vertical direction, the vertical cross section including a top portion, a bottom portion, and a middle portion between the top and bottom portions, the top portion having a vertical dimension greater than a maximum thickness of the plate and a thickness in vertical cross section that is substantially constant, the thickness of the top portion and a thickness of the bottom portion each being greater than a thickness of the middle portion, the shape of the gusset plates approximating a strain distribution in said pair of gusset plates.

2. The joint connection structure of claim 1, wherein, said moment-resisting connection between said beam and said gusset plates comprises longitudinal welds along said gusset plates, in the longitudinal direction of said beam.

3. The joint connection structure of claim 2, wherein, said beam has two flanges; and said column has two flanges each separately joined to said pair of gusset plates; and said moment-resisting connection of said beam to said column comprises an end of said beam being spaced from said column to define a gap, so that said beam is connected to column by said gusset plates spanning said gap and carrying moment in a vertical plane.

4. The joint connection recited in claim 2, wherein, said beam has two flanges and said joint connection structure further includes a pair of vertically spaced apart cover plates sandwiching said beam vertically; one of said pair of cover plates attaching respectively to each one of said two flanges of said beam; said moment-resisting connection including said pair of cover plates being spaced from said column to define a respective gap.

5. The joint connection structure of claim 1, wherein said joint connection includes a second beam opposite to and generally aligned with said beam so that said pair of gusset plates horizontally sandwich said column and beam as well as said second beam.

6. A joint connection structure comprising:
a column having a longest dimension and providing columnar support to a building;
a pair of generally aligned beams on opposite sides of and intersecting with said column to carry load so that said column provides support for said beams, each beam having a longest dimension;
wherein said beams are connected to said column in a moment-resisting connection including a pair of spaced apart gusset plates horizontally sandwiching said column so that said gusset plates extend along opposite sides of and are joined to both said column and said pair of beams;
wherein each gusset plate has a length extending generally parallel to the longest dimension of the beams and orthogonal to the longest dimension of the column when the gusset plates are joined to the column and beams, a height extending generally parallel to the longest dimension of the column and orthogonal to the longest dimension of the beams, and a thickness extending generally orthogonal to the length and height of the gusset plate, the thickness having a configured shape in vertical cross section which is non-uniform in a vertical direction such that a thickness of the vertical cross section varies in the vertical direction, the vertical cross section including a top portion, a bottom portion, and a middle portion between the top and bottom portions, the top portion having a vertical dimension greater than a maximum thickness of the plate and a thickness in vertical cross section that is substantially constant, the thickness of the top portion and a thickness of the bottom portion each being greater than a thickness of the middle portion, the shape of the gusset plates approximating a strain distribution in said pair of gusset plates.

7. The joint connection of claim 6 further including plural continuity plates generally arranged in pairs aligned top and bottom with said beams on opposite sides of said column, and said continuity plates being joined to said column between flanges thereof.

8. The joint connection of claim 6 further including a pair of cover plates associated with each of said pair of beams and joining with the associated beam to sandwich the associated beam vertically, said cover plates and said beams defining with said column a respective one of a pair of vertically extending gaps on opposite sides of said column, and said pair of gusset plates spanning said pair of vertical gaps.

9. The joint connection of claim 6 further including a pair of shear plates associated with each one of said pair of beams and joining with the associated beam and with said pair of gusset plates substantially at an outer end thereof.

10. A building structure including a beam-to-column, and beam-to-beam structural joint connection, said joint connection comprising:
a column having a longest dimension and providing support for said building structure;
a pair of beams disposed on opposite sides of said column, each beam having a longest dimension;
wherein each of said beams has a respective one end thereof attached to said column in a beam-to-column joint connection transferring gravity load from said beam to said column and having sufficient strength to sustain axial tension substantially equal to the ultimate tensile capacity of said beam;
wherein each said beam-to-column joint connection also provides a moment-resisting connection between said beam and said column capable of sustaining vertical moment on said beam substantially equal to the ultimate vertical moment capacity of said beam;
wherein each said beam-to-beam joint connection also provides a connection between said pair of beams capable of sustaining the interaction of inelastic levels of vertical bending moment and axial tension;
wherein said joint connection includes:
a pair of spaced apart gusset plates horizontally sandwiching said column so that said gusset plates extend along opposite sides of and are joined to both said column and said pair of beams;
wherein each gusset plate has a length extending generally parallel to the longest dimension of the beams and orthogonal to the longest dimension of the column when the gusset plates are joined to the column and beams, a height extending generally parallel to the longest dimension of the column and orthogonal to the longest dimension of the beams, and a thickness extending generally orthogonal to the length and height of the gusset plate, the thickness having a configured shape in vertical cross section which is non-uniform in a vertical direction such that a thickness of the cross section varies in the vertical direction, the vertical cross section including a top portion, a bottom portion, and a middle portion between the top and bottom portions, the top portion having a vertical dimension greater than a maximum thickness of the plate and a thickness in vertical cross section that is substantially constant, the thickness of the top portion and a thickness of the bottom portion each being greater than a thickness of the middle portion, the shape of the gusset plates approximating a strain distribution in said pair of gusset plates;
whereby, axial tension and moment loads caused by earthquake, severe weather, or another stressing event is sustained by said building, and whereby an extraordinary double-span condition for said pair of beams resulting from the loss of support by said column caused by explosive blast is also sustained by said building structure without progressive collapse.

11. The joint connection of claim 10 further including plural continuity plates generally arranged in pairs aligned top and bottom with said pair of beams on opposite sides of said column, and said continuity plates being joined to said column between flanges thereof; and a pair of cover plates associated with each of said pair of beams and joining with the associated beam to sandwich the associated beam vertically, said cover plates and said beams defining with said column a respective one of a pair of vertically extending gaps on opposite sides of said column, and said pair of gusset plates spanning said pair of vertical gaps; a pair of shear plates associated with each one of said pair of beams and joining with the associated beam and with said pair of gusset plates at a respective outer end thereof.

12. An elongate horizontally and vertically extending gusset plate for use in a structural joint connection, connecting a beam to a column, or a pair of beams to a column, said gusset plate comprising:
a pair of vertically spaced apart upper and lower horizontal sections each of determined respective cross-sectional area, and each providing a respective moment area with respect to a neutral axis of the gusset plate for sustaining vertical moment;
a central horizontally extending section disposed between and connecting said pair of upper and lower horizontal sections;

the gusset plate having a maximum thickness and a configured shape in vertical cross section which is non-uniform in a vertical direction such that a thickness of the cross section varies in the vertical direction, and wherein a vertical dimension of the upper and lower horizontal sections is greater than the maximum thickness of the gusset plate, each of the upper and lower horizontal sections having a thickness in vertical cross section greater than a thickness of the central horizontally extending section in vertical cross section, the shape of the gusset plate approximating a strain distribution in the gusset plate.

13. The gusset plate of claim 12 wherein said central section is joined to each of said upper and said lower section by a transition surface selected from the group comprising: a step transition surface, an angulated transition surface, a concave transition surface, and a convex transition surface.

14. The gusset plate of claim 12 wherein said gusset plate is flat on one vertical face, and defines a horizontally extending recess on an opposite vertical face.

15. The gusset plate of claim 12 wherein said central section includes a truss defined by a connecting member extending between said upper and said lower sections.

16. The gusset plate of claim 15 further including a load transfer plate portion disposed within said gusset plate and aligned with said column.

17. The gusset plate of claim 12 wherein said central section includes a plurality of connecting members extending between and connecting said upper and said lower sections, and said plurality of connecting members being arranged to define a truss structure.

18. The gusset plate of claim 12 wherein the upper and lower horizontal sections are each formed as a single piece of material.

19. A joint connection structure comprising:
a column for providing columnar support to a building;
a beam intersecting with said column to carry load so that said column provides support for said beam;
wherein said beam is connected to said column in a moment-resisting connection including a pair of spaced apart gusset plates horizontally sandwiching said column so that said gusset plates extend along opposite sides of and are joined to both said column and said beam;
wherein said pair of gusset plates have a configured shape in vertical cross section which is non-uniform in a vertical direction such that a thickness of the cross section varies in the vertical direction and approximates a strain distribution in said pair of gusset plates; and
fillet welds attaching the gusset plates to the column, each fillet weld comprising:
a pair of vertically spaced apart upper and lower horizontal sections each of determined respective cross-sectional area, and each providing a respective moment area with respect to a neutral axis of the gusset plate for sustaining vertical moment; and
a central horizontally extending section disposed between and connecting said pair of upper and lower horizontal sections;
each fillet weld having a maximum thickness and a configured shape in vertical cross section which is non-uniform in a vertical direction such that a thickness of the cross section varies in the vertical direction, and wherein a vertical dimension of the upper and lower horizontal sections is greater than the maximum thickness of the fillet weld, each of the upper and lower horizontal sections having a thickness in vertical cross section greater than a thickness of the central horizontally extending section in vertical cross section.

* * * * *